(12) United States Patent
Rothschild

(10) Patent No.: US 10,384,501 B2
(45) Date of Patent: Aug. 20, 2019

(54) DIGITAL HARDWARE METHOD, SYSTEM AND DEVICE FOR PREVENTING THE INITIAL ONSET OF TRAILER OSCILLATIONS AND CONTROL THEREOF

(71) Applicant: Michael Benn Rothschild, London (GB)

(72) Inventor: Michael Benn Rothschild, London (GB)

(*) Notice: Subject to any disclaimer, the term of this patent is extended or adjusted under 35 U.S.C. 154(b) by 0 days.

(21) Appl. No.: 15/805,847

(22) Filed: Nov. 7, 2017

(65) Prior Publication Data

US 2018/0093538 A1 Apr. 5, 2018

(51) Int. Cl.
| | |
|---|---|
| *B60D 1/30* | (2006.01) |
| *B60W 10/04* | (2006.01) |
| *B60W 10/18* | (2012.01) |
| *B60W 30/18* | (2012.01) |
| *B60D 1/62* | (2006.01) |
| *H04L 29/08* | (2006.01) |

(52) U.S. Cl.
CPC ............. *B60D 1/30* (2013.01); *B60D 1/62* (2013.01); *B60W 10/04* (2013.01); *B60W 10/18* (2013.01); *B60W 30/18009* (2013.01); *B60W 2420/52* (2013.01); *B60W 2710/18* (2013.01); *B60W 2720/106* (2013.01); *H04L 67/12* (2013.01)

(58) Field of Classification Search
CPC ........... B60D 1/30; B60D 1/62; B60W 10/04; B60W 10/18; B60W 30/18009; B60W 2420/52; B60W 2710/18; B60W 2720/106; H04L 67/12

USPC .......... 701/93, 70, 37, 78, 83; 280/432, 442, 280/445; 340/431
See application file for complete search history.

(56) References Cited

U.S. PATENT DOCUMENTS

| | | | |
|---|---|---|---|
| 7,447,585 B2* | 11/2008 | Tandy, Jr. ............ | B60T 8/1708 180/14.2 |
| 8,571,777 B2* | 10/2013 | Greene .................... | B60D 1/30 701/70 |
| 2008/0172163 A1* | 7/2008 | Englert ..................... | B60T 7/20 701/83 |
| 2009/0093928 A1* | 4/2009 | Getman ................ | B60T 8/1755 701/37 |
| 2009/0228182 A1* | 9/2009 | Waldbauer ............ | B60T 8/1708 701/70 |
| 2010/0152989 A1* | 6/2010 | Smith ....................... | B60T 7/20 701/78 |
| 2011/0087413 A1* | 4/2011 | McCrickard .............. | B60T 7/20 701/70 |

(Continued)

*Primary Examiner* — Marthe Y Marc-Coleman

(57) ABSTRACT

A digital autonomous hardware based FPGA (Field Programmable Gate Array) device and method for preventing the initial onset of trailer oscillations and swaying ("Snaking") movements and subsequent control thereof. The device being a detection and control method for any wheeled trailer which is detachable from the towing vehicle. The system uses a Kalman Filter to processes digital data from a number of wireless IMUs (Inertial Measurement Units) located on the trailer and towing vehicle and then subsequently digitally controls the application and monitoring of simultaneous braking to the trailer while accelerating the towing vehicle in a safe manner in an attempt to quickly alleviate and stop all oscillations and swaying ("Snaking") movements. The system includes a number of other ancillary safety related features.

11 Claims, 12 Drawing Sheets

(56) References Cited

U.S. PATENT DOCUMENTS

| | | | | |
|---|---|---|---|---|
| 2012/0041659 A1* | 2/2012 | Greene | ................... | B60D 1/30 |
| | | | | 701/70 |
| 2016/0101811 A1* | 4/2016 | Kyrtsos | ................. | B62D 13/06 |
| | | | | 701/25 |
| 2017/0151845 A1* | 6/2017 | Allcorn | ................... | B60D 1/62 |
| 2019/0001944 A1* | 1/2019 | Ying | ...................... | B60T 8/248 |

\* cited by examiner

DIGITAL HARDWARE METHOD, SYSTEM AND DEVICE FOR PREVENTING THE INITIAL ONSET OF TRAILER OSCILLATIONS AND CONTROL THEREOF

BACKGROUND

The present invention relates to a method as defined in claim 1 and as a system as defined in claim 10.

This invention relates to a method and system for preventing the initial onset and further development of trailer oscillations and swaying ("Snaking") movements, which commonly occur when towing a trailer, caravan, boat or similar nonautomotive vehicle behind an automotive powered vehicle. The automotive powered vehicle may have a power plant of either a petrol engine, diesel engine, electric motor or hybrid nature.

The term trailer as used in this description refers to any wheeled device that is attached to and can be removed from a suitably powered towing vehicle. A trailer may be used for moving a boat or car from one location to another. A further embodiment of a trailer as described in this invention could include a horsebox trailer used for moving a live horse from location to location. Other embodiments may include a caravan, which may be towed from location to location whilst on touring holiday or trip. One further embodiment of a trailer may include a wheeled device used for moving large volumes of goods from location to location. Clearly, the term trailer can refer to any number of different embodiments of a device with an axle or multiple axles and wheels or multiple wheels used for a wide range of purposes; the constant similarity between any of these trailers is that they are attached and detached from a powered towing vehicle as defined above.

An increasing number of serious towing related accidents occur each year across the world due to the onset and development of trailer oscillations and swaying ("Snaking") movements, which the driver of the towing vehicle is unable to control and cease. The proliferation of these oscillations, also known as "Snaking" based accidents that occur each year are increasing fundamentally due to the growing popularity of towing based sporting activities and holidays.

In the United Kingdom, persons holding a license issued prior to 1 Jan. 1997 may usually drive a vehicle and trailer with a combined maximum authorised mass (MAM) up to 8,250 kg, which is approximately 8 (eight) imperial tons. Persons with license issued after 1 Jan. 1997 may drive a vehicle and trailer combination with a combined maximum authorised mass (MAM) up to 3,500 kg, which is approximately 3.4 (three point four) imperial tons. These substantial limits allow persons with limited or no previous training or experience to tow trailers of a considerable mass and thus momentum. A sizeable momentum is often one of the main contributing factors in oscillation ("Snaking") based towing accidents.

Presently, the majority of stabilizing based systems appear to be based around microcontroller software based detection systems which attempt to reduce and stabilize the trailer after the oscillations ("Snaking") movements have developed fully in both the trailer and towing vehicle. The systems then appears to rely upon slowing both the trailer and towing vehicle simultaneously. These systems slow the towing vehicle immediately by applying braking actions to both the vehicle being used to tow the trailer and in some cases also the trailer itself (if it posses fully controllable brakes) simultaneously. Often, in some more basic set-ups, the application of overrun (surge) brakes if fitted to the towed nonautomotive vehicle (trailer) are applied by the oscillation force itself. This basic system, although commonly found, does not allow for any monitored and controlled braking force on the trailer.

The present invention relates to a method and system and device for preventing the initial onset and further development of trailer oscillations and swaying ("Snaking") movements at the very initial inception of the digitally detected and monitored oscillations. The system utilizes an FPGA (Field Programmable Gate Array) based detection, monitoring and control system with a Mesh network of Bluetooth Low Energy (BLE version 5.0 onwards) IMUs (Inertial Measurement Units) sensors located on both the trailer (nonautomotive vehicle) and the towing vehicle (automotive vehicle). The use of the FPGA digital hardware based technology allows for at least one order of magnitude (10×) speed increase within the detection, monitoring and control system over software based microcontroller systems. The system utilizes a Kalman filter algorithm within the hardware of the FPGA to reduce noise within the IMUs sensor data prior to processing. The system then runs its own specific algorithm using the multiple IMU's data to detect the initial onset of trailer and towing vehicle oscillations and swaying ("Snaking") movements. Once the FPGA hardware based algorithm has detected the initial onset of oscillations and swaying ("Snaking") movements the system then detects if it is safe to initiate its oscillation and swaying ("Snaking") reduction procedure.

A brief overview of the basic oscillation and swaying ("Snaking") procedure will now be explained prior to drawings being discussed and an in-depth explanation being given in full later. The system, once it has detected the very initial onset of oscillations and swaying ("Snaking") movements within the IMUs data from either and/or both the trailer and towing vehicle; the system's hardware based FPGA and Dual ARM Cortex-A9® processors will undertake the following procedures. The system will if possible detect by communicating with the vehicle's CAN Bus if it is safe to increase vehicle speed. The system will do this by requesting information from the towing vehicle's LIDAR (Light Detection and Ranging) Cruise Control System (or equivalent system) if available via the CAN Bus Network; if this information is not available then the driver of the vehicle will be required to actuate a paddle control or button on the steering wheel surround subsequent to a beeping noise within the cabin area of the towing vehicle. Assuming that the system has received information either from LIDAR or driver that it is safe to initiate the procedure it will immediately commence its procedure as follows.

The system will initially apply a low duty cycle PWM (Pulse Width Modulation) driving signal in the region of 35% to both of the trailer actuators (left and right) so as to apply a small amount of braking force of around 35% to the trailer or towed nonautomotive vehicle. Simultaneously, the system will increase the towing speed of the towing vehicle having already ascertained that it is safe to do so by either LIDAR or driver intervention as discussed above. The increase in road speed will be in the region of 10% of the previous road speed. The system will then wait a short amount of time, in the region of 250 ms to 500 ms (two-hundred and fifty milliseconds to five-hundred and fifty milliseconds) prior to analysing once again the signals from the IMUs. The four signals from the IMUs, or more if a greater number of IMUs are fitted to the trailer; will once again be analysed through a Kalman filter using the hardware FPGA as previously detailed above. Trailers having a longer wheelbase, which may have an additional number of axles may require an additional number of IMUs to be mounted on the trailer located around a line that traverses the wheels of the additional axles. Once the filtered signals have been compared within the original signals prior to the brake signals being applied (brake application on trailer only) and the road speed increased of the towing automotive vehicle, a decision will be made to either incrementally increase the braking PWM signal pulses and speed further, or to remain as is, or decrease. The decision will be made based on either the oscillations and swaying ("Snaking") movements increasing or decreasing. A detailed description of this procedure will be given after the drawings have been discussed in detail.

The major advantage of this invention and method is that oscillations and swaying ("Snaking") signals received from the IMUs are processed in real-time with a Kalman Filter in hardware (FPGA). The processing of at least four separate channels or more of IMU's data is being undertaken in parallel execution within the FPGA's hardware and not being processed sequentially as it would if it was being processed within a Micrcontroller's CPU within a software algorithm. The FPGA hardware's processing speed advantage is at least an order of magnitude (10×) faster than in software within even one of the fastest Microcontroller's currently on the market presently.

The present embodiment of the invention utilizes a ZYNQ 7000® series SoC FPGA. This particular FPGA allows for a combination of both Field Programmable Gate Array (FPGA) type hardware with a Dual Core ARM Cortex-A9 Processors with each core running at a speed of up to 1 GHz. This particular FPGA is manufactured by Xilinx®, however a similar embodiment of this invention could be produced with a similar FPGA with either a Single or Dual Core ARM Cortex Processor from another manufacturer such as Altera®, Actel® or Lattice Semiconductor® to name just a few possible alternatives.

The present embodiment which utilizes the ZYNQ 7000® series SoC FPGA with its Dual ARM Cortex-A9 Processors allows for a processing speed increase of at least an order of magnitude (10×) greater than any other Microcontroller software based system. The ZYNQ 7000® series also offers the advantage of the "AXI" (Advanced eXtensible Interface) connection between the Programmable Logic of the FPGA and the Processing System of the Dual ARM Cortex-A9 Processors. These hardware and software link advantages allow the present invention to process and control the trailer oscillations and swaying ("Snaking") movements in virtually real-time so as to be able to control and stop the oscillations ("Snaking") at its onset prior to its further development into enlarged oscillations which otherwise may develop further without the ability to curtail them.

The present invention offers a number of other safety advantages over other anti oscillation ("Snaking") systems currently on the market. These briefly include a GPS communications module that allows a database of oscillation ("Snaking") prone areas (known as "black spots") to be logged and catalogued for future safety advice. The system also incorporates an emergency braking system for the trailer, so that in the event of the trailer becoming detached from the towing vehicle the brakes will automatically and immediately be applied to the trailer and the hazard and braking lights will instantly be applied. The hazard and braking lights on the trailer will be powered from the rechargeable batteries of the wireless electric brake actuators; this will be described in more detail later in the description. These and further additional safety features will be discussed in more detail after the description of the drawings in the detailed description that follows.

SUMMARY OF THE INVENTION

Prior to description of the drawings and further detailed description of the invention, it should be noted that this invention differs from the existing inventions within this field and attempts to solve the trailer oscillations and swaying ("Snaking") problem in a completely different manner. The following paragraphs explain the differences between this invention and prior inventions within the field.

All other inventions in this field detect in some manner the oscillations and swaying ("Snaking") produced by either the trailer and or the towing vehicle once the oscillations and swaying ("Snaking") movements are in a fully developed stage. The fully developed oscillations and swaying ("Snaking") movements would normally be of a magnitude that can easily be felt within the towing vehicle as an uncomfortable and uncontrollable oscillating and swaying ("Snaking") movements and which would already be causing anxiety and concern for the occupants of the towing vehicle. The next stage that virtually all of the existing inventions take is to reduce both the speed of the towing vehicle and the trailer (towed nonautomotive vehicle) simultaneously. This is normally undertaken by immediately applying the brakes further to at least the towing vehicle and in some cases also the trailer at the same time. The application of these brakes will usually continue to either the oscillations ("Snaking") have stopped or both the trailer and the towing vehicle have completely stopped. This method of attempting to stop the oscillations by application of heavy braking forces can often lead to worse oscillations and unplanned and uncontrollable direction changes of the trailer and towing vehicle occurring. These unwanted and uncontrollable responses may also lead to accidents involving other road users as the oscillations and swaying patterns of the trailer and towing vehicle develop further and become completely uncontrollable until the vehicles comes to a complete standstill once all momentum has been expended. In certain circumstances, if the oscillations and swaying ("Snaking") movements develop to such an extent and intensity that they are not controllable, this could lead to trailer and/or towing vehicle being overturned.

The major advantage of the present invention is that by utilizing the latest digital hardware based FPGA (Field Programmable Gate Array) SoC with Dual Core ARM Cortex-A9 Processors technology based system it is possible to detect and identify the very initial onset stage of the trailer oscillations and swaying ("Snaking") movements. Having detected these very initial oscillations at the initial and fundamental onset of the oscillations ("Snaking") it is possible to stop the oscillations developing any further by utilising digital controlled braking forces on the trailer 7 (nonautomotive towed vehicle) whilst simultaneously accelerating the towing vehicle 1 in a digital controlled manner. The latest digital embedded FPGA hardware allows for the fastest possible data processing and Kalman noise filtering via running the algorithm on the FPGA and then digitally controlling the braking and acceleration responses to the trailer 7 and towing vehicle 1 as detailed above. The latest FPGA hardware allows for the system to run at a speed in excess of an order of magnitude (10× or more) greater than that possible on a microcontroller software based system alone, in a processing manner that allows all the IMU's data to be processed in parallel at the same time. This parallel processing nature, further enhances the performance and thus end results of the system.

The principle system detailed in this invention has been fully tested, refined and proven by towing a twenty-four (24) foot boat and trailer combination (total length 31 foot) with a braked trailer using a Land Rover®/Range Rover® combination in excess of six-thousand four-hundred miles (6400). The total weight of the boat and trailer was in excess of three point four (3.4) imperial tons. The boat and trailer was towed on a number of occasions from Southend, England to the South of France and returned to England.

BRIEF DESCRIPTION OF THE DRAWINGS

The invention will now be described in detail by way of reference to the following numbered drawings.

DESCRIPTION OF THE PREFERRED EMBODIMENT

The preferred system uses the combination of digital hardware in the form of FPGA 22 (Field Programmable Gate Arrays) running a number of processes in a parallel manner. Concurrently with the digital hardware processes running in parallel, software will be running sequentially on Dual ARM Cortex-A9 Processors. The fully autonomous monitoring and control system attempts to prevent the initial onset and development of trailer 7 and towing vehicle 1 oscillations and swaying movements ("Snaking") by utilising the latest form of digital hardware based technologies (FPGA 22), which continually monitors movements in both the trailer 7 and towing vehicle 1 simultaneous whilst the trailer is being towed. The FPGA 22 based hardware of the Central Controller 20 runs at least at a speed in excess of an order of magnitude (10×) faster than other software based only Microcontroller systems.

The towing vehicle 1 and trailer 7 movements are monitored continuously in real-time with at least four IMUs 5, 6, 14 and 17, which contain accelerometers amongst other sensor types. A further IMU 25 is also monitored which is located within the Central Controller 20. All the IMUs 5, 6, 14, 17 and 25 are communicating with the Central Controller 20 via a Bluetooth Low Energy Version 5.0 (or later specification thereof) Mesh Network. The accelerometers detect a minimum of Yaw, Roll and Pitch movements on both the trailer 7 and towing vehicle 1 simultaneously. The digital data from all of the IMUs are processed in parallel in real-time on the FPGA 22 (Field Programmable Gate Array) so as to process and filter the large volume of data concurrently. Conventional systems may attempt to process this large volume of digital data with a software based processor such a microcontroller which would process the data from the IMUs in a sequential manner which would be at least one order of magnitude slower (10× slower). The processing speed of the system is particularly important as it is essential to detect and control the trailer 7 and towing vehicle 1 oscillations and swaying ("Snaking") movements as quickly as possible prior to the onset of fully developed set of oscillations occurring which may be far more difficult to safely control and rectify quickly.

Figure 15:
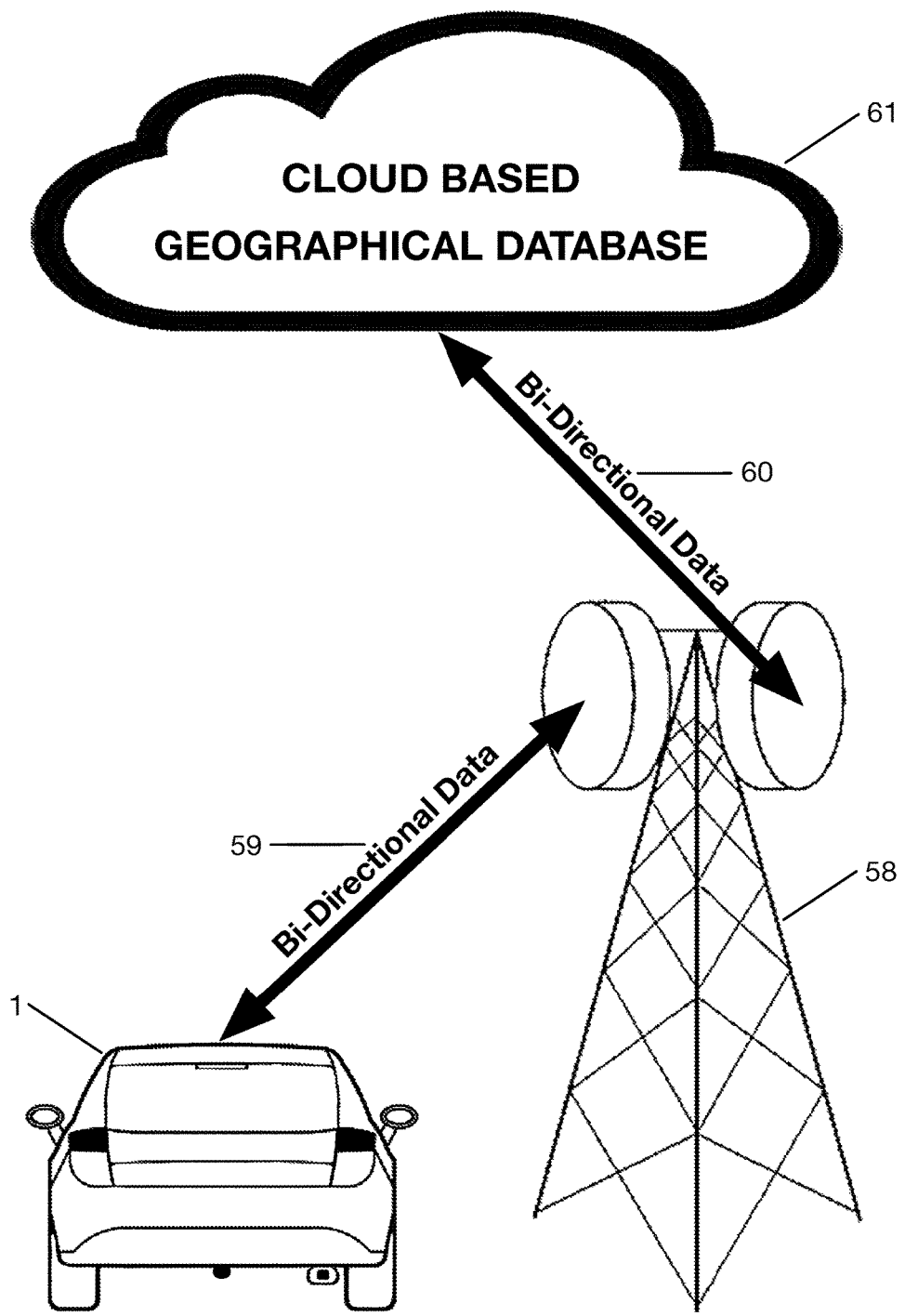
FIG. 15 depicts one possible embodiment for the towing vehicle 1 to communicate in a bi-directional manner with a remote located Cloud Based Geographical Database 61. The vehicle 1, communicates using the cellular mobile network using either a cellular communications radio within the Central Controller 20 and/or by using a nominated cellular mobile telephone within the towing vehicle. The cellular connection is made in a bi-directional manner 59 with a local Cellular Tower 58 and then bi-directional data 60 is transmitted from the Cellular Tower 58 to the Cloud Based Geographical Database 61. The towing vehicle 1 can with this established link send and receive data as required and without intervention from towing vehicle's driver.

The system's Central Controller 20, receives, logs and stores a variety of other data, which includes acceleration, altitude, vibration, magnetic orientation, GPS (Global Positioning System) data, local time and temperature. This data is stored in F-RAM (located in the ARM Cortex M4 Microcontroller circuit board 23) which is a type of Nonvolatile Ferroelectric Random Access Memory. The almost unlimited 100 trillion read/write cycles of this type of memory ensures virtually infinite endurance and security of the stored data. Certain data is processed through a Kalman Filter to remove noise and improve the quality of the signals prior to the system processing and analysing them. The system is linked to the towing vehicle's CAN Bus Network so that it is able to receive data and information from the towing vehicle and pass data back to the towing vehicle. This data may also be transmitted to a Cloud Based Geographical Database 61 via a mobile network as depicted in FIG. 15, which will be explained in further detail later in the description.

One preferred embodiment of the system will now be described in detail with reference to the drawings so as to fully explain the workings of the Digital Hardware Based System (FPGA 22) and Method for Preventing the Onset of Trailer and Towing Vehicle Oscillations and Control. The following fifteen figures and description explain in detail one possible embodiment of the invention. A variety of alternative embodiments of this system can exist and some alternatives will be described within this detailed description that follows.

Figure 1:
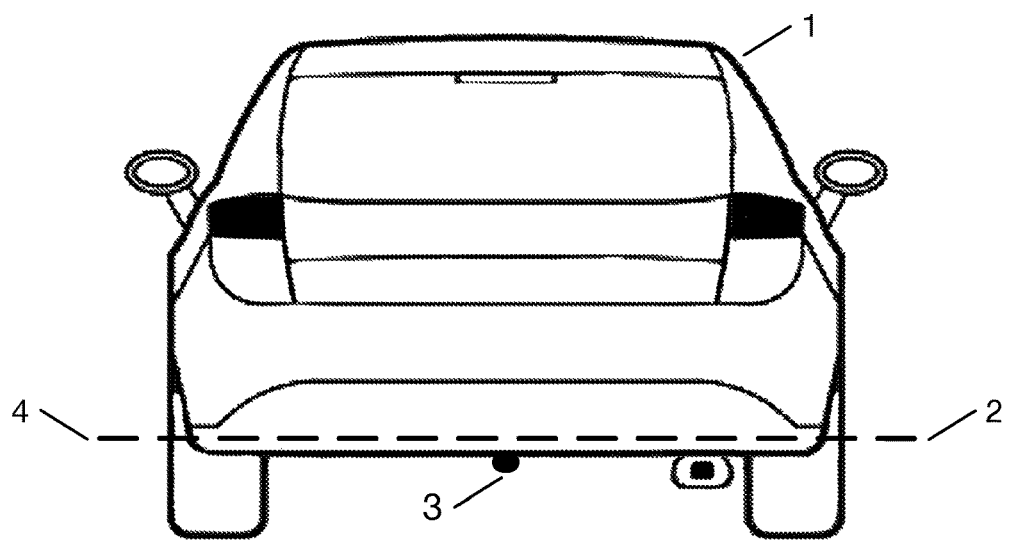
FIG. 1 illustrates a preferred embodiment of the invention showing the rear view of the towing vehicle 1 with a dotted line 2, 4 traversing through the rear wheels to depict the line of measurement of the wireless Bluetooth BLE 5.0 Mesh Networked IMUs and the tow bar attachment 3.

FIG. 1, depicts the towing vehicle 1 with a line drawn numbered 2 to 4 to represent the line of measurement of the IMUs located in the towing vehicle. The towing hitch 3 is also depicted at rear centre point of the vehicle 1.

Figure 2:
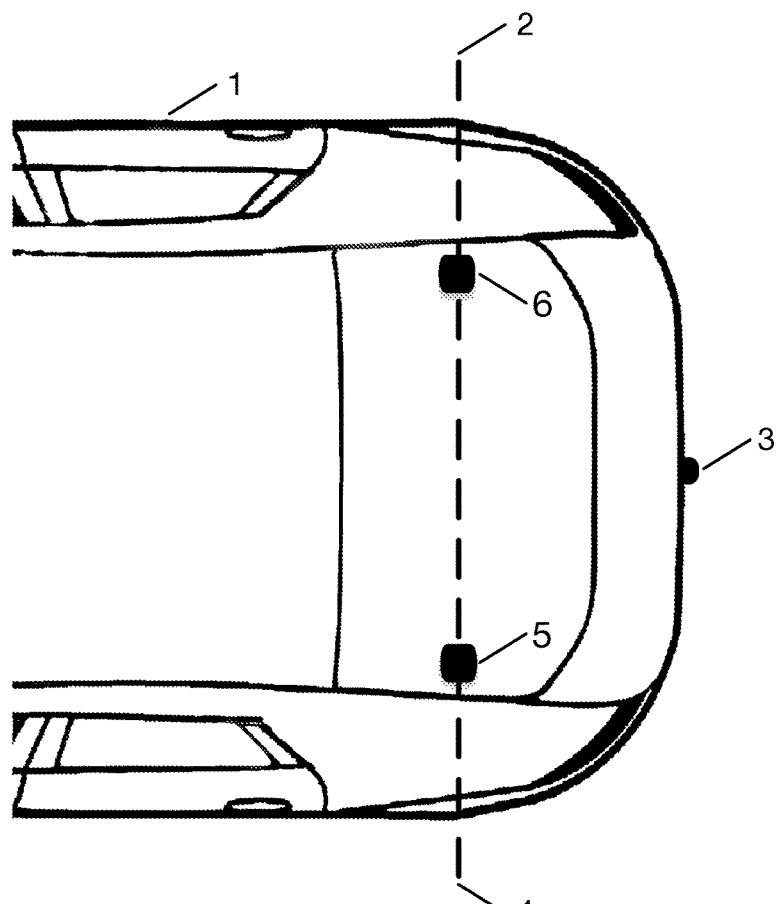
FIG. 2 illustrates a preferred embodiment of the invention showing the plan view of the towing vehicle 1 with both IMUs 5 and 6 depicted with a dotted line 2, 4 traversing through the rear wheels to depict the line of measurement of the wireless Bluetooth BLE 5.0 Mesh Networked IMUs and the tow bar attachment 3.

FIG. 2, depicts a plan view of the towing vehicle 1 again with the line numbered 2 to 4 shown to represent the line of measurement of the two separate wireless Bluetooth BLE 5.0 Mesh Networked IMUs shown numbered 5 and 6. The towing hitch attachment 3 can also be seen in this plan view of the vehicle 1. The two wireless IMUs 5 and 6 are located within the rear boot space of the towing vehicle and are located centred above the centre line that runs between the left and right rear wheels of the towing vehicle 1. The two IMUs 5 and 6 both communicate with the Central Controller 20 (which is detailed in FIG. 4 to follow) via Bluetooth Low Energy (BLE) using a BLE Version 5.0 (or later specification thereof) Mesh Networking. Once the towing vehicle is moving the two IMUs 5 and 6, continually transmit data to the Central Controller 20, the data from each IMU sensor includes information such as Yaw, Roll, Pitch and vibration movement amongst other data which is processed by the Central Controller 20.

Figure 3:
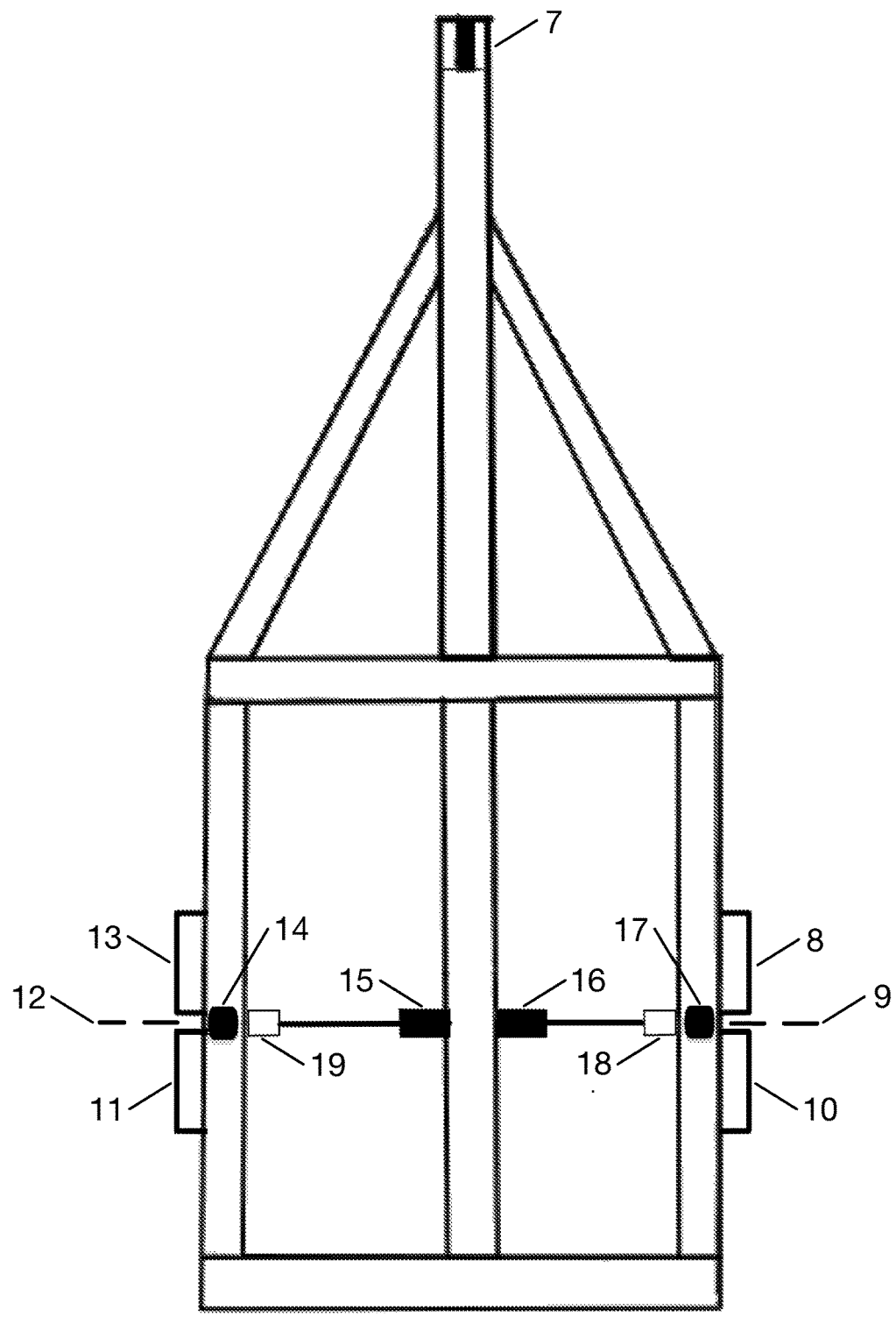
FIG. 3 illustrates a preferred embodiment of the invention showing a four-wheeled close-coupled trailer 7 with left and right braking actuators 15, 16 and wireless Bluetooth BLE 5.0 Mesh Networked IMUs 14, 17 depicted with a dotted line 9, 12 shown between the close coupled wheels 8, 10, 11 and 13 to depict the line of measurement from the IMUs.

FIG. 3, depicts an embodiment of the invention which is a trailer 7 for a boat in this particular instance. The front of the trailer is located around 7, which depicts the trailer hitch attachment, which will be located and interlocked to towing hitch 3 depicted in FIGS. 1 and 2 of the towing vehicle. The trailer depicted in this particular embodiment is a four (4) wheeled close-coupled trailer. The trailer's rights wheels are 8 and 10 with 8 being the front right wheel and 10 being the rear right rear wheel. The trailer's left front wheel is 13 and 11 is the rear left wheel. The line depicted by 9 and 12 is a straight line, which passes through the centre line of the four (4) close-coupled wheels and is used to depict the sensing of the IMUs 14 and 17 on the trailer. The two IMUs 14 and 17 both communicate with the Central Controller 20 (which is detailed in FIG. 4 to follow) via Bluetooth Low Energy (BLE) using a BLE Version 5.0 (or later specification thereof) Mesh Networking. Once the trailer is moving the two IMUs 14 and 17 continually transmit data to the Central Controller 20, the data from each IMU sensor includes information such as Yaw, Roll, Pitch and vibration movement amongst other data, which is processed by the Central Controller 20. The system's electronic wireless BLE 5.0/WiFi brake controller actuators 15 and 16 are mechanically connected to the trailer's left and right 19 and 18 brake actuators respectively which individually control the left and right brakes of the trailer which apply braking force to the four (4) wheels 8, 10, 11 and 13 of the trailer. The system allows for differential braking forces between the left wheels 11, 13 and the right wheels 10, 8 of the trailer if the system so requires.

Figure 4:
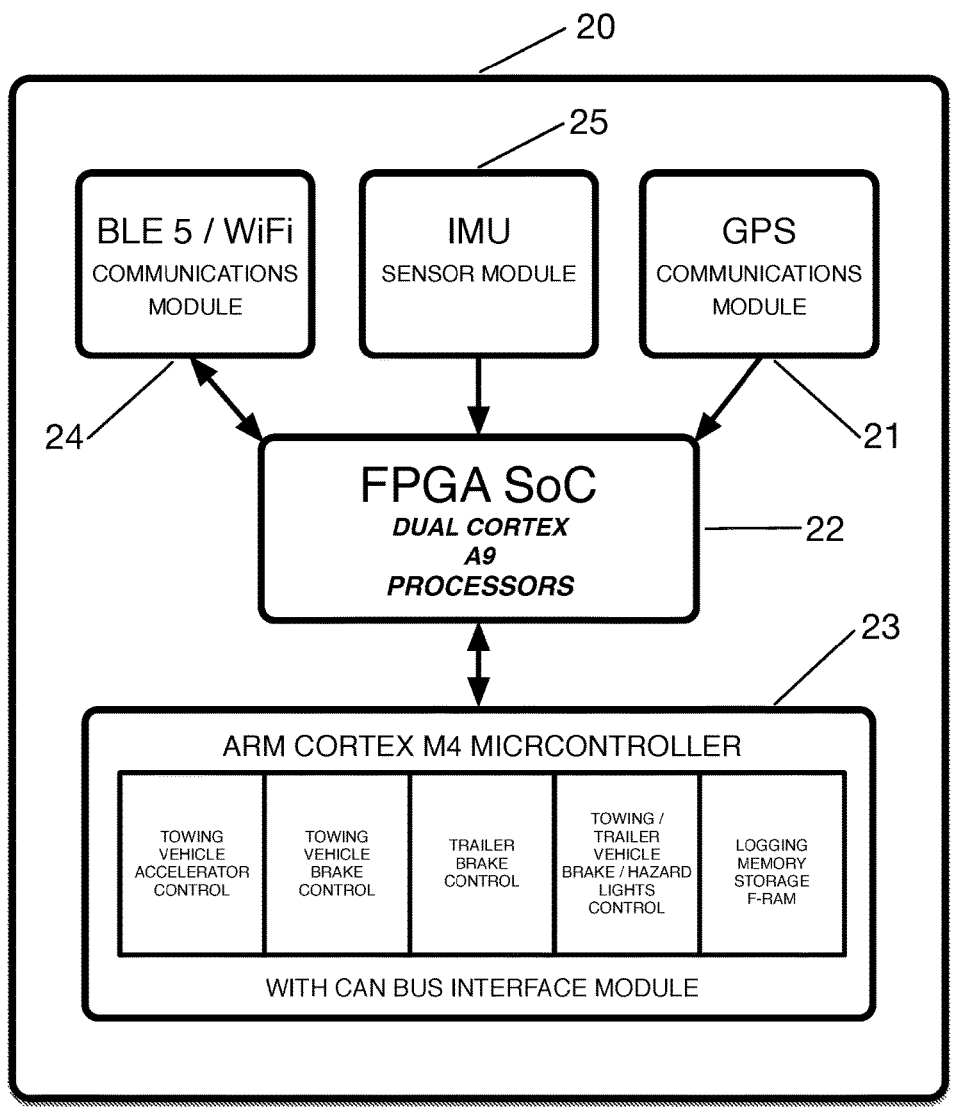
FIG. 4 illustrates a preferred embodiment of the main controller's system box 20 which incorporates BLE 5/WiFi Communications Module 24, IMU Sensor Module 25, GPS Communications Module 21, Xilinx ZYNQ 7000® FPGA SoC Dual ARM Cortex-A9 Processors 22 and ARM Cortex M4 Microcontroller 23 with CAN Bus Network Interface Module.

FIG. 4, is the Central Controller 20 of the system. The Controller is made up of a number of interconnected networked modules. The location module incorporates a GPS (Global Positioning System) Module 21 which communicates with the FPGA (Field Programmable Gate Array)

ZYNQ-7000 SoC with Dual Core ARM Cortex-A9 Processors 22. The Central Controller also contains a PSoC-6 Microcontroller 23. This PSoC 6 or device of similar specification includes both an ARM Cortex-M4 which is interfaced by the CAN Bus to the FPGA SoC ZYNQ-7000 22. The PSoC-6 23 is responsible for a number of tasks related to the towing vehicle and trailer. The PSoC 6 also communicates directly with the towing vehicle via the vehicle's CAN Bus using the built-in CAN Bus interface that the PSoC 6 (or device of similar specification) has. The PSoC-6 controls the towing vehicle's accelerator and brake control along with the towing vehicle's brake and hazard lights. The PSoC-6 also controls the trailer's brake actuators (left 15 and right 16) and brake and hazard lights of the trailer. The Central Controller 20 also has a BLE 5/WiFi Communications Module 24 which is directly interfaced to the FPGA SoC ZYNQ-7000 22 via the AXI Bus. This BLE 5/WiFi Communications Module 24 allows for BLE 5.0 Mesh Networking with the other BLE 5.0 parts of the system. The Communications Module 24 also allows for WiFi connection to either other parts of the system or to an external mobile phone or tablet device with WiFi and internet access for software/firmware updates throughout the system. The final component of the Central Controller is the built-in IMU Sensor Module 25 which is interfaced to the FPGA SoC ZYNQ-7000 22 via the AXI Bus for ultimate data transfer speed. The Central Controller will be discussed later in the description in detail, as its operation is central to the functioning of the entire system.

Figure 5:
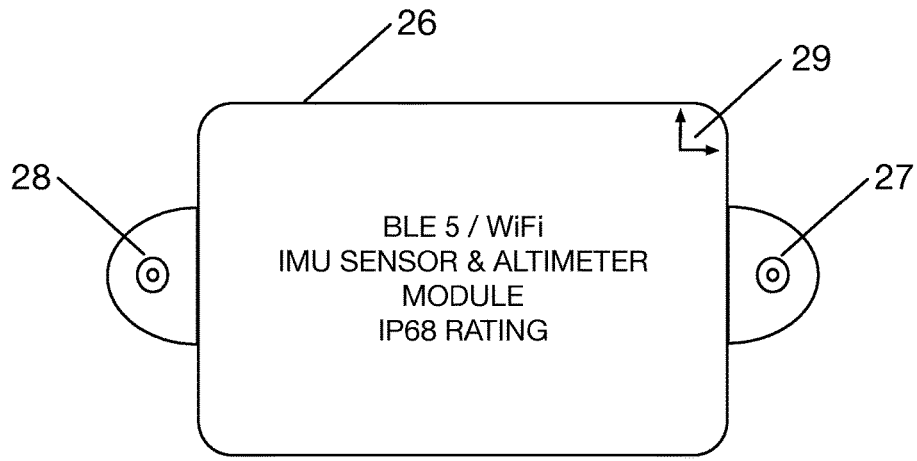
FIG. 5 illustrates a preferred embodiment of the BLE 5/WiFi IMU Sensor Module and Altimeter Module encased within a waterproof and dustproof enclosure 26 rated to IP68 rating with quick fastening removable screw mountings 27 and 28 and IMU alignment marking 29.

FIG. 5, is the IMU Sensor and Altimeter Module 26 which incorporates BLE 5/WiFi communications. The module is an IP68 rated sealed unit. The module 26 has two mounting location positions 27 and 28 with rubber dampers to alleviate vibration transfer from the body (trailer 7) to which it is mounted. The plastic IP68 sealed case of the module also has markings 29 for correct positioning of the module as can be seen in the top right corner of the module located above and to the left of the mounting position 27.

Figure 6:
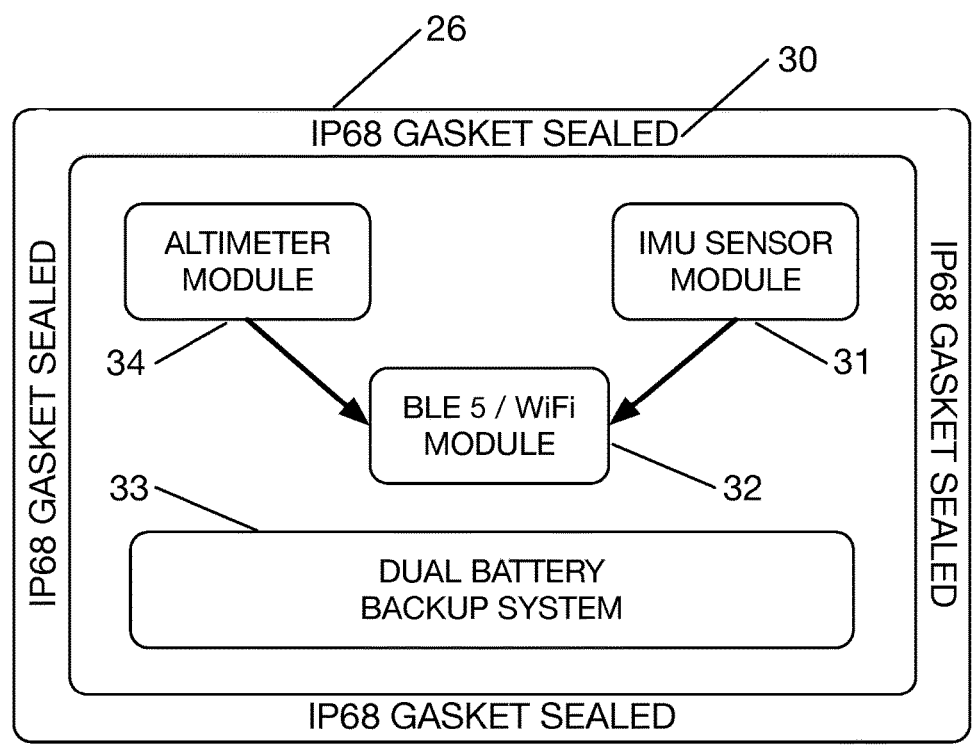
FIG. 6 illustrates a preferred embodiment of the BLE 5/WiFi Module 32, IMU Sensor Module 31 and Altimeter Module 34 with Dual Battery Backup System 33, and the communications paths between the Altimeter Module 34, IMU Sensor Module 31 and BLE 5/WiFi Module 32 sealed within a gasketed waterproof and dustproof IP68 rated enclosure 26.

FIG. 6, depicts the internal module details of the IMU Sensor and Altimeter Module 26. The module is IP68 sealed via the rubber gasket 30 which surrounds the perimeter of the module casing. The internal components of the module comprise of an IMU Sensor 31, BLE 5/WiFi Module 32, Dual Battery Backup System 33 and Altimeter Module 34. The system is powered by both a re-chargeable Li-Ion battery pack and also a backup Lithium CR2032 3 volt battery cell. The IMU Sensor Module 31 and Altimeter Module 26 is normally powered via the Li-Ion battery pack cell which is rechargeable via an IP68 sealed USB socket on the module casing; should the rechargeable battery run-out or fail then module immediately switches over to the CR2032 3 v battery backup cell and reports this as an error on the towing vehicle's dashboard via the CAN Bus network using the Central Controller 20 CAN Bus link to the towing vehicle. The IMU Sensor Module 31 and Altimeter Module 26, uses all low energy electronics which allows for it to run on a CR2032 battery backup for a minimum of thirty-six (36) hours of operation once it has reported that the main rechargeable Lithium-Ion battery is out of power and requires recharging. The main Lithium-Ion battery pack should last approximately one-hundred and eighty (180) hours of operation on a full charge which is in the order of twenty-five (25) days approximately. The screw fittings 27 and 28 on the IMU Sensor and Altimeter Module 26 are designed for easy removal so that it is simple and quick to remove the Module for charging and storing over the winter and during periods of non-use.

Figure 7:
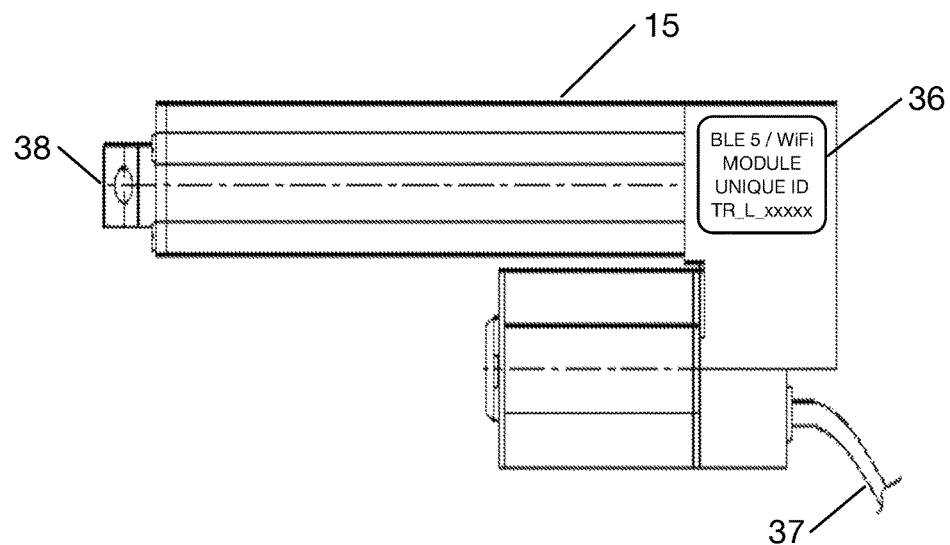
FIG. 7 illustrates a preferred embodiment of the left brake actuator with BLE 5/WiFi Module 36 with unique ID code for security and encased rechargeable power pack and power charging lead 37 and brake actuator rod 38.
Figure 8:
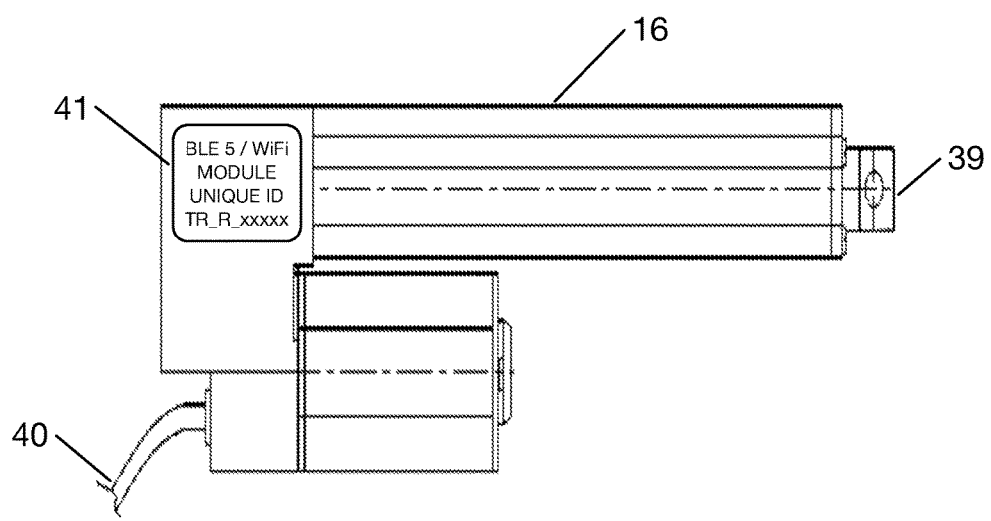
FIG. 8 illustrates a preferred embodiment of the right brake actuator with BLE 5/WiFi Module 41 with unique ID code for security and encased rechargeable power pack and power charging lead 40 and brake actuator rod 39.

FIGS. 7 and 8 are the left 15 and right 16 wireless BLE 5./WiFi electronic brake actuators respectively. The actuators are effectively identical with the exception that they each have a unique identification number programmed within flash memory of the microcontroller used within each separate unit to allow individual access to each brake controller and offer a high level of security. The unique identification number along with the unique MAC address of the Bluetooth Low Energy 5.0 Mesh Network in each of the actuators 15 and 16 ensures that the actuators are extremely safe from any external security and/or hacking attempt to operate the actuators by a system outside of the owner's own towing vehicle 1.

The brake actuators are powered via a rechargeable Lithium-Ion cell that is encased within each brake actuator. The Lithium-Ion cells are continuously recharged via the trailers power connection to the towing vehicle. The charging leads 37 and 40 of the left and right actuators respectively can be seen in the FIGS. 7 and 8 respectively. The built-in power cell (Lithium-Ion battery) also allows for the each actuator to operate should the power supply fail on the trailer or towing vehicle or in an extreme case the trailer becomes detached from the towing vehicle. The system has a failsafe that should the trailer become detached from the towing vehicle for any reason the Central Controller 20 will detect this via either a failure on the power charging circuit and/or the signal strengthen denoted by the Received Signal Strength Indication (RSSI) of the Bluetooth Low Energy 5.0 Mesh Network link substantially reducing from previous average readings over the past recorded averages in the proceeding ten (10) minute period on both wireless electronic actuators, then the emergency brakes will be applied to the trailer to immediately stop the trailer. One embodiment of the system will also flash the hazard lights on the trailer 7, which will be powered by the Lithium-Ion batteries in the Electric Brake Actuators 15 and 16 assuming sufficient power is available to do so from the actuators. The actuators circuit will establish this. The application of the brakes and hazard lights on the trailer in the above exceptional circumstance offers a degree of safety not found on any other system and should hopefully bring the trailer to a safe stop on its own in a short distance from the point at which it became detached from the towing vehicle.

Figure 9:
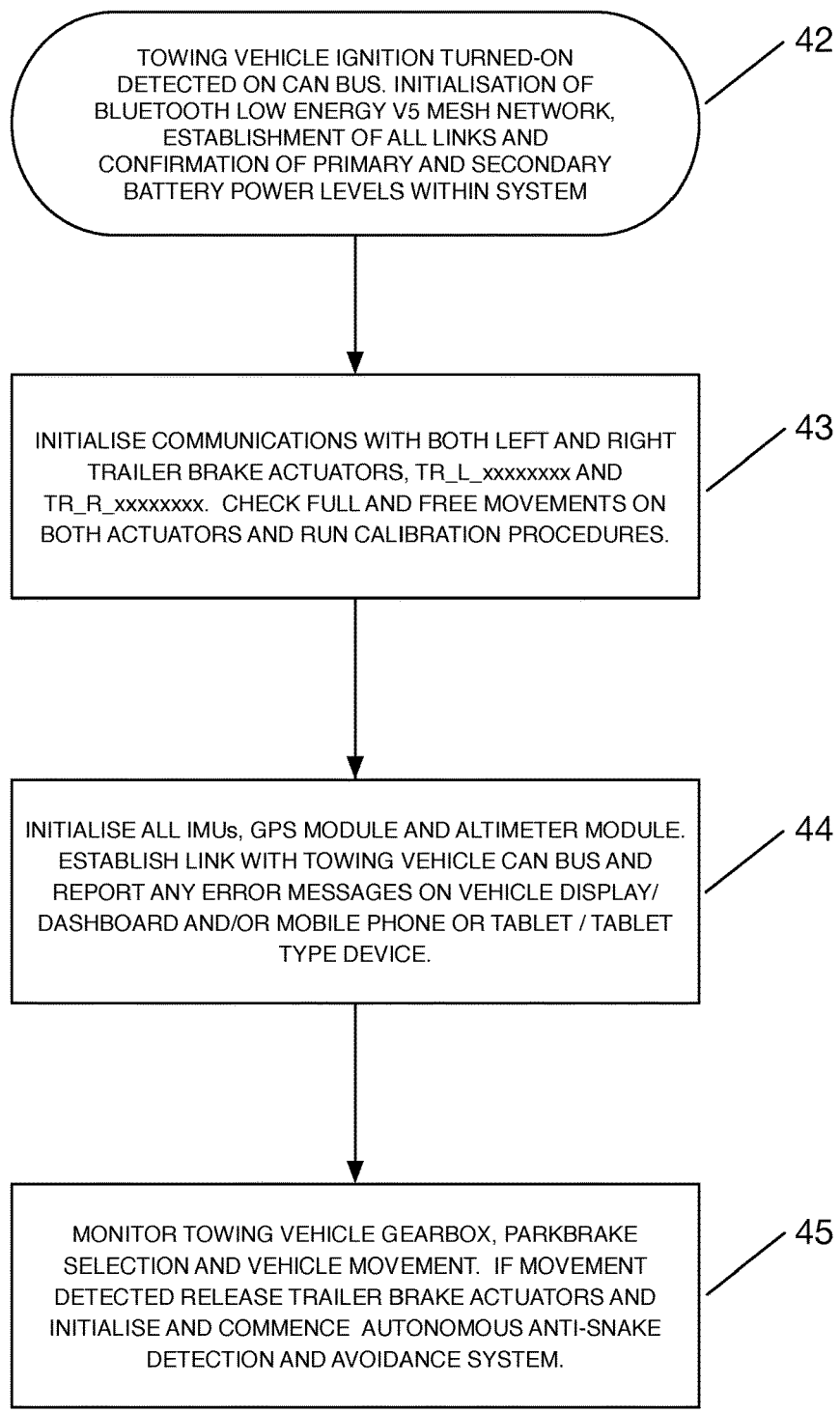
FIG. 9 is a flowchart showing the start-up procedure including: Bluetooth BLE 5 Mesh Network initialisation sequence, battery primary and secondary power level confirmation checks 42, left and right brake actuator communication initialisation check with movement and calibration procedure 43, initialisation of all IMUs, GPS and Altimeter Modules, establishment of vehicle CAN Bus network, report any error messages on dashboard and/or mobile phone or tablet 44, monitor towing vehicle gearbox and park brake selection if vehicle movement detected initialise and commence autonomous anti-snake detection and avoidance system 45.

FIG. 9 is a flowchart of the start-up, test and initialization sequence of the system. The system will initially 42 sense that the towing vehicle has been started in the case of a petrol or diesel vehicle (or turned on in an electric/hybrid type vehicle). The system will attempt to establish all Bluetooth Low Energy 5.0 Mesh Network Links. The system will also establish primary and secondary battery levels within the system. The battery levels of the IMUs and Electronic Braking Actuators will be checked. The system will then initialise communications with both the left 15 and right 16 brake actuators in step 43 of the flowchart. The system will also, in step 43, check full and free movements on both actuators and run calibration procedures for both of the Electronic Braking Actuators 15 and 16 to ensure that the trailer brakes mechanism is free and working and also that both of the Electronic Braking Actuators 15 and 16 are working fully and properly prior to the towing vehicle and trailer moving. A failure of either of the actuators will be immediately reported as an error via the vehicles CAN Bus and thus dashboard display and possibly via a mobile phone or tablet device in the vehicle if connected to the system's network. The system will then in step 44 initialise all links with all IMUs and Altimeter Modules 26 and ensure reasonable stationary data is received from all the Modules. The system will also establish a link with the CAN Bus via the Central Controller 20, should this fail or any rogue data be seen on any of the IMUs 5, 6, 14 and 17 including the unit 25 located in the Central Controller 20 then the system will report an error message on the vehicle's dashboard via the CAN Bus and also via a mobile phone or tablet device in the vehicle if connected to the network. The system will in step 45 monitor the selection of the towing vehicle's gearbox and park brake selection. If movement is detected and all other earlier steps have been passed the trailer brake actuators 15 and 16 will be released and the system will initialise and commence autonomous oscillation ("Anti-snake") detection and avoidance.

Figure 10:
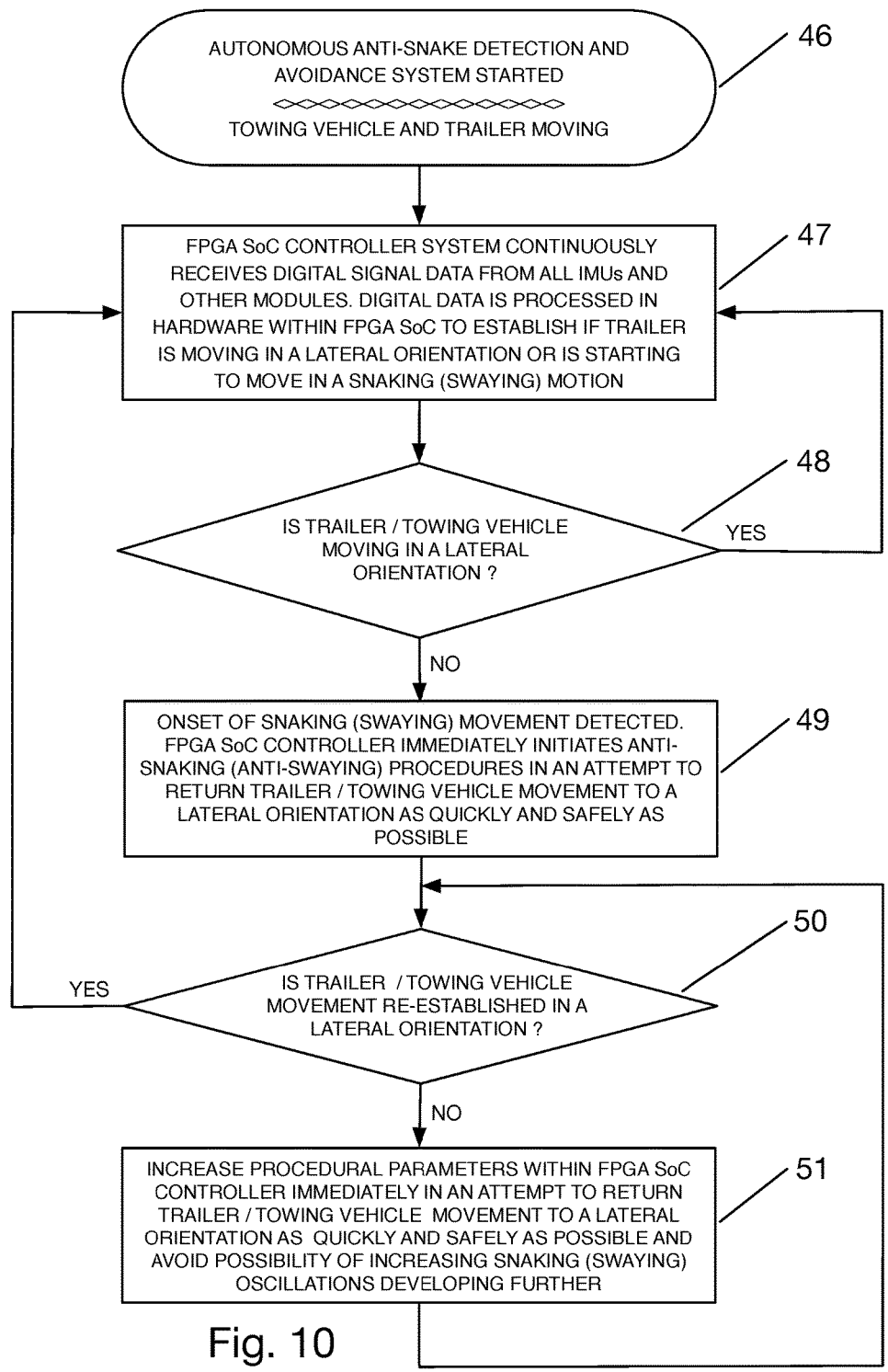
FIG. 10 is a flowchart depicting the basic control and monitoring of oscillations and anti-snaking (anti-swaying) procedures running in a continuous monitoring loop once the towing vehicle and trailer are moving.

FIG. 10 is a flowchart of one possible embodiment of the autonomous oscillation ("Anti-snake") detection system having started as the trailer and towing vehicle begin to move as detailed in step 46. The Central Controller 20 with its FPGA SoC ZYNQ-7000 receives digital signal data from all IMUs 5, 6, 14, 17 and 25. The IMUs data is processed through a Kalman Filter to reduce all unwanted noise and improve signal quality from all the IMUs. The signals from all the above five (5) IMUs are processed in the hardware of the FPGA SoC ZYNQ-7000 in real-time to establish if the trailer is moving in a lateral orientation or if it is starting to move with an oscillation/snaking (swaying) motion. The system will continue to monitor in hardware (FPGA SoC ZYNQ-7000) 22 in real-time; if it detects that the trailer is moving in a normal lateral orientation then the system will continue to monitor towing vehicle 1 and trailer 7 movements moving from step 48 to step 47 in FIG. 10's flowchart.

Figure 12:
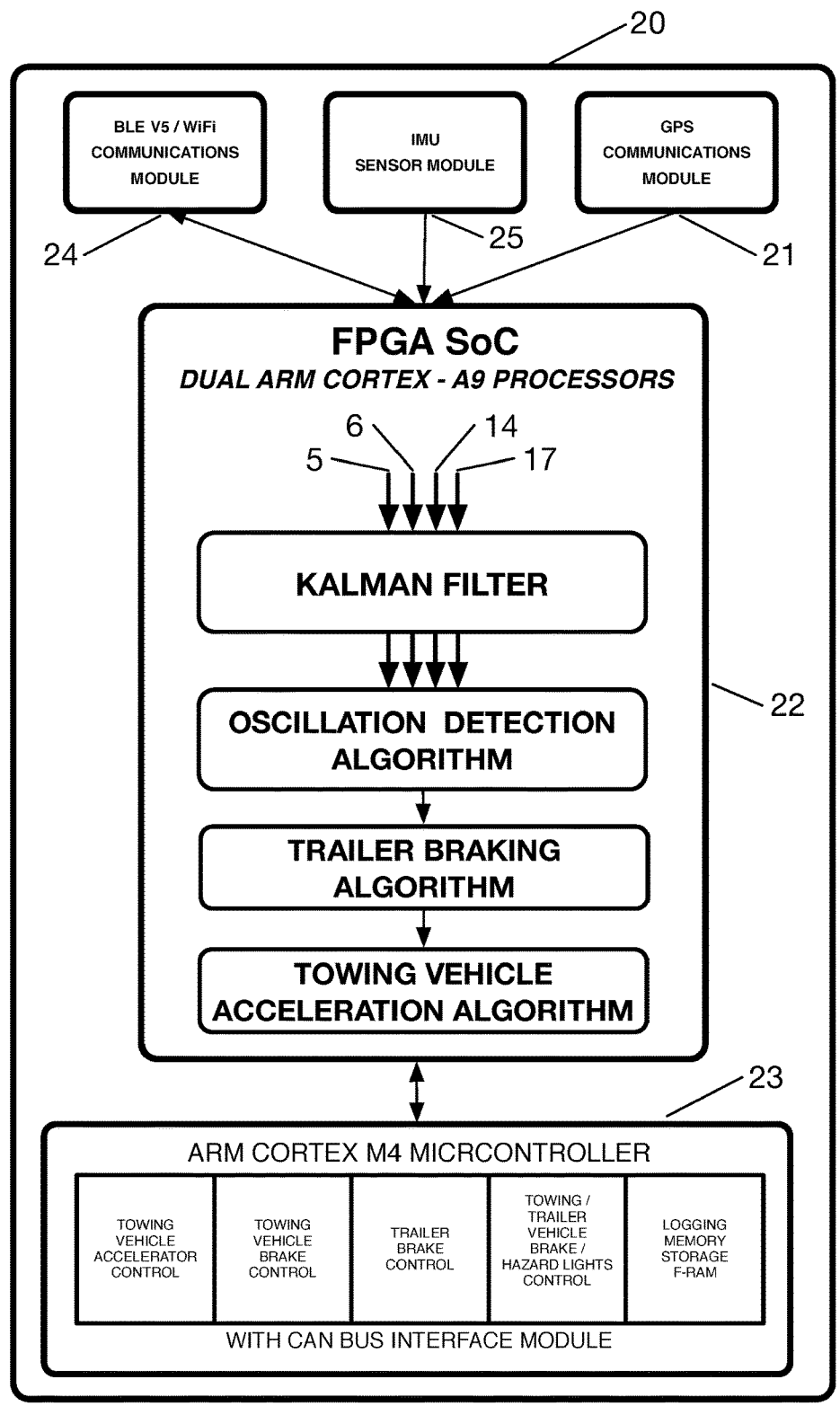
FIG. 12 depicts the Central Controller 20 main components, comprising of the FPGA (Field Programmable Gate Array) SoC ZYNQ-7000 22 which is the primary fundamental digital processing hardware of the Central Controller 20. One preferred embodiment of this invention is based around the FPGA 22 processing all the towing vehicle 1 and trailer 7 IMUs 5, 6, 14 and 17 digital data in parallel with a Kalman Filter to reduce the greater majority of rogue noise that may be present. The FPGA 22 then processes Oscillation Detection Algorithms, Trailer Braking Algorithms and Towing Vehicle Acceleration Algorithm to control the system with the assistance a BLE 5 WiFi Communications Module 24, IMU Sensor Module 25, GPS Communications Module 21 and a ARM Cortex M4 Micrcocontroller with CAN Bus Interface 23. A further and more detailed description of the Central Controller 20 follows later in the description.

The monitoring will continue and if the onset of oscillations (swaying "Snaking" movements) are detected by the IMUs 14 and 17 located on the trailer 7 and or on the IMUs 5 and 6 located in the towing vehicle 1 the system will immediately initiate anti-swaying ("anti-Snaking") procedures in an attempt to return the trailer and or towing vehicle movements to a lateral orientation as quickly and safely as possible. The anti-swaying ("anti-Snaking") procedures are performed in hardware on the FPGA 22 (Field Programmable Gate Array) SoC ZYNQ-7000 using a variety of logic gates with the processing being performed in parallel manner as opposed to sequentially as in software. The immediate advantage of the FPGA's parallel processing is a speed increase in excess of an order of magnitude (10×) greater than if the processing was being undertaken solely in a microcontroller based processor in a sequential manner. A description of the parallel algorithm performed within the FPGA SoC ZYNQ-7000 as depicted in FIG. 12 item 22 will be given later in this description; presently a brief explanation will be given as follows.

Once the system has detected an initial onset of oscillations, swaying ("Snaking") movements, which may have been detected by anyone or a combination of the IMUs 14, 17, 5 and 6 within the system, the anti-swaying ("anti-Snaking") procedures are initiated. The system will then continue to monitor all of the IMUs 14, 17, 5 and 6 to establish if the procedures previously initiated in step 49 of the flowchart in FIG. 10 have reduced or completely alleviated all the oscillations ("Snaking") movements. The system will increase its parameters in step 51 of the flowchart (FIG. 10) if oscillations have not reduced and then return to step 50 to see if the oscillations have subsided; if they have not then step 51 will increase the parameters incrementally once more, in a further attempt to stop or reduce the severity of the oscillations present in the trailer 7 and/or towing vehicle 1.

Figure 11:
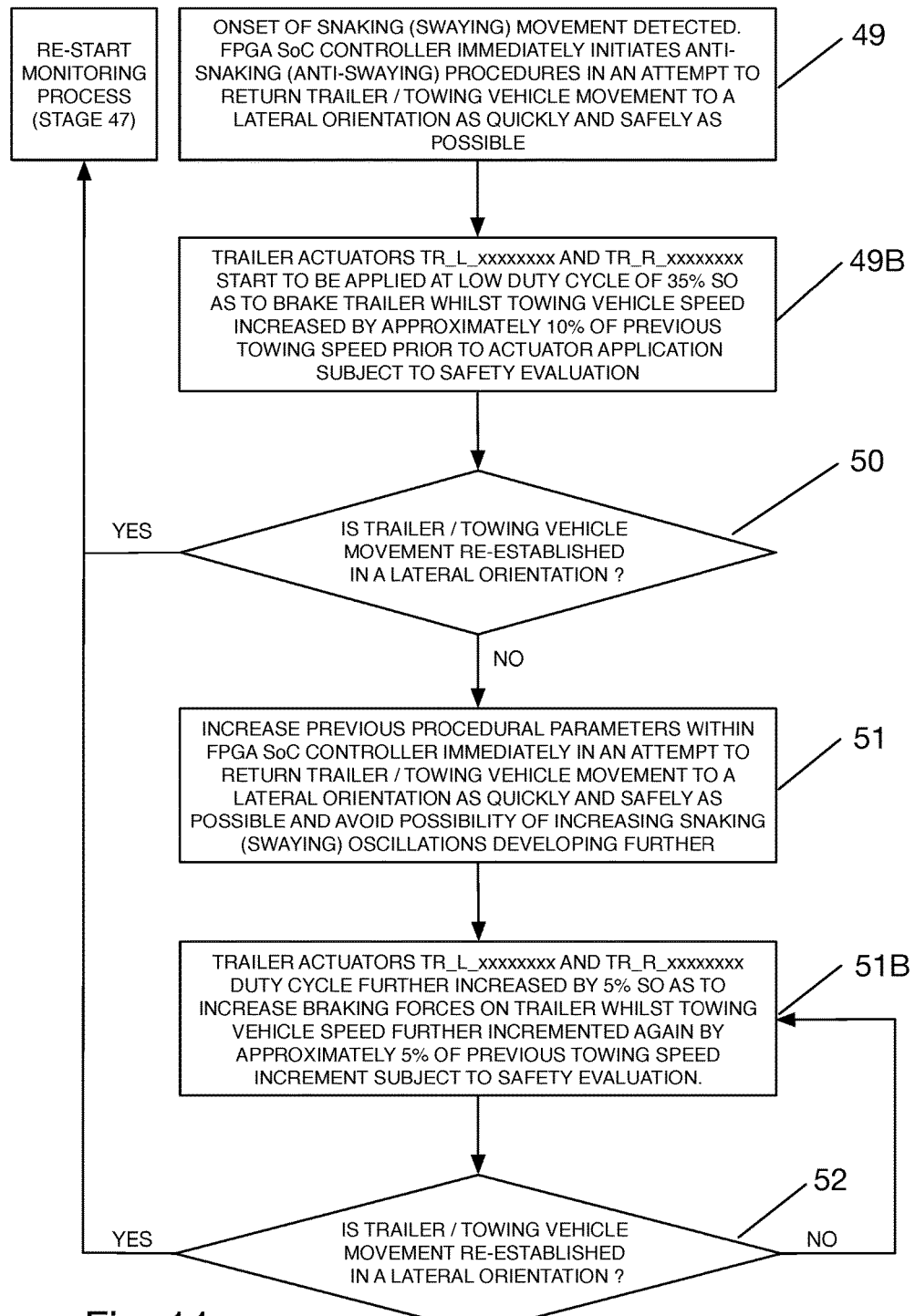
FIG. 11 is a flowchart depicting the advanced control, monitoring and adjustments cycles (trailer braking and duty cycle braking increase with simultaneous vehicle speed increase percentages) of the anti-snaking (anti-swaying) procedures which are run in the FPGA hardware and M4 Microcontroller software procedures of the Central Controller 20. If oscillations and swaying ("Snaking") is detected during the towing of the trailer re-establishment into standard monitoring procedure only occurs once the trailer and towing vehicle movements have re-established into a lateral orientation once again after the oscillation and swaying ("Snaking") procedures have worked.

FIG. 11 is a more detailed flowchart system analysis of the anti-oscillation ("anti-Snaking") procedures and steps described in overview in FIG. 10's flowchart. The flowchart in FIG. 11 commences at step 49 once the initial onset of oscillations (swaying) movements have been detected via the IMUs 14, 17, 5 and 6 described above. The system immediately initiates procedures to reduce or completely alleviate all the oscillations detected via the IMUs located in the trailer 7 and towing vehicle 1.

The system's Central Controller 20 in step 49B of the flowchart in FIG. 11 communicates with the trailer's braking actuators 15 and 16 and immediately in this embodiment applies at a PWM (Pulse Width Modulation) duty cycle of 35% braking force to both left and right brake actuators simultaneously whilst increasing towing speed by approximately 10% of previous towing speed. Prior to the towing vehicle's speed being increased a safety evaluation will be made to ensure it is safe to do so. This safety evaluation procedure is undertaken using either the towing's vehicle 1 adaptive cruise control and/or a LIDAR based collision avoidance system. The towing vehicle's speed is controlled via one of the vehicle's networks such as CAN, LIN, FlexRay or current equivalent automotive type protocol. The FPGA SoC ZYNQ-7000 22 (located in the Central Controller 20) is able to digitally produce by bit banging any suitable automotive network protocol that is required. A short delay of approximately 250 ms to 500 ms (milliseconds) is given after applying the trailer brakes bilaterally (only the brakes on the trailer are applied) and the road speed of the towing vehicle 1 increase is reached and held for the above 250 ms to 500 ms before the system in step 50 of the flowchart (FIG. 11) confirms if the trailer 7 and or towing vehicle 1 is re-established in a lateral orientation without any further oscillations (swaying movements). The system will further incrementally increase the previous braking and acceleration parameters if it detects that the oscillations have either remained the same or increased; this is undertaken in steps 51 and 51B of the flowchart (FIG. 11). The trailer's wireless brake actuators 15 and 16 (left and right respectively) will receive a wireless control signal from the Central Controller 20 via Bluetooth Low Energy V5 (Mesh Networking) link. The duty cycle of both the braking actuators 15 and 16 will be increased by approximately 5% so as to increase braking forces on the trailer's wheels; simultaneously the towing vehicle's speed will be further increased by approximately 5% of the previous towing speed subject to a prior safety evaluation being made as described above. A further short delay of approximately 250 ms to 500 ms (milliseconds) will be made before a further evaluation (via processing the signals of IMUs 5, 6, 14 and 17) in step 52 of the flowchart (FIG. 11) is undertaken to establish if the lateral orientation of the trailer 7 and or towing vehicle 1 has been re-established. The system will pass control back to step 51 if the oscillations (swaying movements) have not subsided or stopped. The system will pass control back to step 47 of flowchart in FIG. 10 if the trailer 7 and or towing vehicle 1 has re-established a completely lateral orientation without any oscillations, swaying ("Snaking") movements. Further explanation will be given in the description below of the system, outlined above.

FIG. 12 depicts the FPGA 22 (Field Programmable Gate Array) SoC ZYNQ-7000 series located in the Central Controller 20. One purpose of this FPGA based hardware device within this particular embodiment is to filter all the signals in parallel from the IMUs 5, 6, 14 and 17 with a Kalman Filter to reduce the majority of rogue noise and thus ensure the cleanest most accurate signals from all the IMUs in real-time. The filtering of this data allows for the Central Controller 20 to immediately detect the onset of any oscillation movement patterns in either the trailer's IMUs 14 and 17, or the IMUs 5 and 6 located within the towing vehicle 1. This particular embodiment allows for the shared use of hardware based real-time parallel processing within the FPGA (Field Programmable Gate Array) SoC ZYNQ-7000 combined with extremely fast software processing within the Neon of the Dual ARM Cortex-A9 Processors in the ZYNQ-7000 based device which are able to process data sequentially within the two processor cores at speeds up to 1 GHz. The dual cores of the FPGA 22 SoC ZYNQ-7000 have an advanced single instruction, multiple data engine (SIMD) known as "NEON". The NEON processing system offers full floating point arithmetic; which along with the aforementioned single instruction, multiple data engine (SIMD) allows for further speed increases in processing of the multiple data streams of information being received from the IMUs 14, 17, 5 and 6 of the trailer 7 and towing vehicle 1. The FPGA 22 hardware along with the NEON processing ensures that this embodiment of the system is at least an order of magnitude (10×) faster than any other conventional software based system would be and many orders of magnitude faster than any mechanical based system. The quicker the initial onset of oscillations ("Snaking") movements are detected the quicker, easier and safer it is to stop further development (number and magnitude) of the oscillations ("Snaking") movements. The embodiment of this present system not only allows for safer towing of the trailer (and vehicle) which the system is fitted to, but also ensures the safety of other road users from the dangers of a trailer and vehicle near them which is experiencing uncontrollable oscillations ("Snaking") movements on public roads, highways and motorways and which could lead to life threatening accidents.

The processed and filtered (Kalman) data from the IMUs is then immediately and continuously run through an Oscillation Detection Algorithm to establish if any trace oscillations (Yaw) or onset thereof is present. Assuming that oscillations (Yaw) is detected then the Central Controller 20 will immediately communicate with the Bluetooth BLE V5.0 (or current latest equivalent thereof) Mesh Network wireless braking controllers 15 and 16 of the trailer and apply the anti-swaying ("anti-Snaking") procedures which include application of the trailer brakes by using the Trailer Braking Algorithm executed within the FPGA 22 hardware whilst increasing the towing vehicle speed incrementally using the Towing Vehicle Acceleration Algorithm executed within the FPGA 22 hardware until the oscillations have subsided or stopped completely.

A detailed description of the sequence of events in this procedure can be found in the flowcharts within FIGS. 10 and 11. This present embodiment of hardware based FPGA 22 technology along with the aforementioned NEON system of the dual core ARM A9 processors located within the FPGA allows for all the processing in the three main algorithms (Oscillation, Trailer Braking and Towing Vehicle Acceleration) to be undertaken simultaneously in real-time from the multiple streams of the IMUs data 5, 6, 14 and 17 as depicted in FIG. 12 item 22. This simultaneous processing would not be possible in a system using a microcontroller-based processor.

Figure 13:
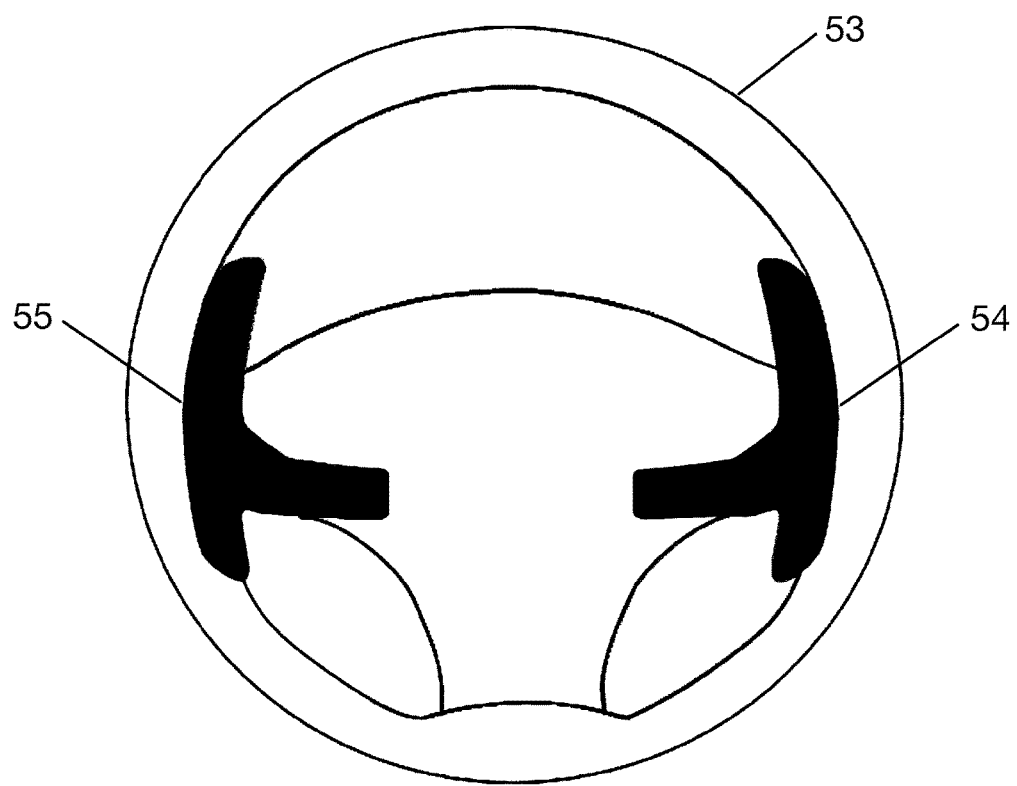
FIG. 13 illustrates a preferred embodiment for a towing vehicle steering wheel 53 with two paddle controls 54 and 55 used to manually override and control the oscillations ("Snaking") control system, the left paddle 55 controls the trailer braking effort whilst the right paddle 54 increases the towing vehicle speed.

FIG. 13 is a drawing of one particular embodiment of a steering wheel 53, which is fitted with dual paddle type controls 54 and 55 located, equidistantly to either side of the centre line of the steering wheel. The paddles 54 and 55 (positioned as right and left respectively) are connected to the Central Controller 20 via the towing vehicle's CAN Bus network. The paddle controls 54 and 55 allow the driver to override the fully automatic and autonomous anti-swaying ("anti-Snaking") system. The driver may then operate the system manually with the assistance of the system, but still with overall control of the system.

The paddles 54 and 55 allow the driver of the towing vehicle 1 to manually control the application of trailer 7 braking system and increment the speed of the towing vehicle 1 to subside and stop the oscillations, swaying movements ("Snaking") of the trailer 7 and towing vehicle 1. The autonomous system can be programmed to completely monitor and control the initial onset and development of trailer and/or towing vehicle oscillations without direct driver intervention. The autonomous control of this particular embodiment has been described in detail in the previous paragraphs. The system can also be controlled through the direct use of the two paddle controls 54 and 55 as depicted on the steering wheel in FIG. 13. The use of these paddle controls 54 and 55 will now be discussed as follows.

The paddle controls, 54 and 55, which are located on the drivers right and left of the steering wheel respectively, function as follows. The right paddle control 54, controls the application of gentle and gradual braking on the trailer 7. The drivers left paddle control 55 controls the application of gentle and gradual acceleration of the towing vehicle 1 (under the control of the system for safety). The controls allow the driver of the towing vehicle 1, with the assistance of the Central Controller 20, to manually apply braking action on the trailer 7 and increase acceleration on the towing vehicle 1 simultaneously to reduce trailer 7 and towing vehicle 1 oscillations, swaying ("Snaking") movements. The system still ensures as previously discussed that it is safe to increase the speed of the towing vehicle 1 by using the adaptive cruise control and/or LIDAR system that is fitted to the towing vehicle 1. The braking action, which is soley applied to the trailer 7, is controlled by the systems hardware based FPGA 22 (Field Programmable Gate Array) SoC ZYNQ-7000 whilst the system gradually increases the acceleration of the towing vehicle 1. Whilst the steering wheel mounted paddle controls 54 and 55 offer a degree of manual control over the system, ultimate functionality and control is still automated to ensure safety, speed and performance that would be unattainable with a completely manual system. The paddle controls can be disabled if desired.

Figure 14:
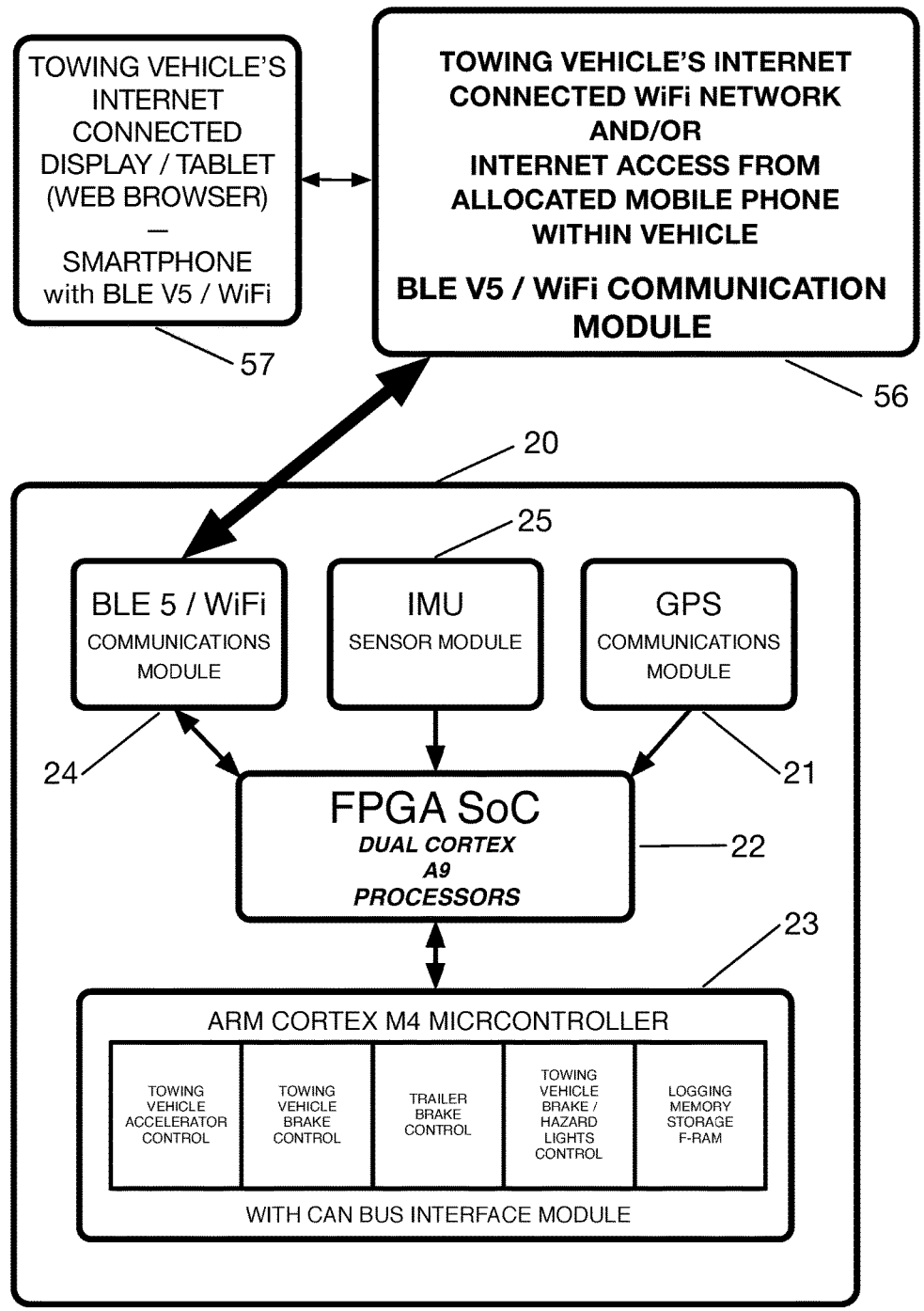
FIG. 14 illustrates a preferred embodiment for the Central Controller 20, which is communicating with the wireless cellular network of the towing vehicle 1. The components of the Central Controller 20 have been detailed in FIG. 4 previously. The vehicle's cellular network 56 may either be from the vehicle's own cellular network hotspot or if the vehicle does not possess one then a mobile telephone within the vehicle can be allocated to allow for internet access. The system is then able to display messages, errors and warnings on an internet connected display 57 present in the towing vehicle 1 or on a tablet with WiFi connection located within the towing vehicle using a suitable web browser on either the vehicle's display or tablet.

FIG. 14 depicts the wireless Bluetooth Low Energy (BLE V5 or latest equivalent thereof) or WiFi connection between the Central Controller 20 and the Towing Vehicle's Internet connection via Bluetooth Low Energy (BLE V5 or latest equivalent thereof) or WiFi. This connection allows data to be sent from the Central Controller 20 which may include GPS (Global Positioning System coordinates) and other relevant data acquired and processed by the Central Controller's 20 FPGA 22 (Field Programmable Gate Array) SoC device in relation to the trailer and towing vehicles oscillations ("Snaking") movements. The data may either be shared and uploaded to a remote storage cloud based server 61 either using the vehicle's own internet connection module 56 if it has one or alternatively by a nominated connection to a mobile telephone with internet connection within the towing vehicle 1 which the Central Controller 20 has wireless or Bluetooth access to. The connection and upload to a remote cloud server database 61 is depicted in FIG. 15 which is discussed in detail shortly.

The system can display operational data, messages and warnings about geographical locations that are prone to causing trailer 7 and towing vehicle 1 oscillations, swaying ("Snaking") movements. The aforementioned type of information and warnings can be displayed on the vehicle's Internet connected display or tablet 57 by using a web browser based interface. The system can be set-up to display an image of the trailer 7 and towing vehicle 1 so that any onset of oscillations ("Snaking") movements can be displayed in real-time for occupants of the towing vehicle to view. The display or tablet will also allow for system parameter changes to be made and input that will immediately be updated to the system's Central Controller 20. These changes can be made via the touch screen of the towing vehicle's internet connected display and or suitable wireless internet connected tablet in the vehicle. The vehicle's display and tablet 57 can also be used to review previous oscillation ("Snaking") events and display the current state of the trailer and towing vehicle's oscillations ("Snaking") movements in real-time whilst the trailer is being towed. The aforementioned information will either be displayed within a web browser window or a suitable App (Application) running on the towing vehicle's display or wireless connected tablet.

A further embodiment of the present system would allow for the system to be monitored, controlled and towing reviewed (after the event) on a smartphone 57 running a suitable App. The Application on the smartphone 57, could either run on a iOS® or Android® operating system or similar current equivalent thereof. The Application would also be able to be run on a Windows® based smartphone 57 or tablet device 57 (iOS®, Android® and Windows® operating system). The connection to the smartphone would either be by Bluetooth Low Energy (BLE V5 or latest equivalent thereof) or WiFi connection between the device and the Central Controller 20.

One particular embodiment of this system allows for data and geographical position information to be sent back to a central server with information collected from the Central Controller 20 and the IMUs 5, 6, 14 and 17 located on the trailer and towing vehicle. This information can be sent from the towing vehicle 1 via a cellular network and may be immediately stored on a Cloud Based Geographical Database 61 which can be shared with other users of the Cloud Based Geographical Database 61. A further explanation of this part of the embodiment is given with reference to the next FIG. 15, as follows.

FIG. 15 depicts one possible embodiment of the system components necessary for the towing vehicle's Central Controller 20 to communicate in a bi-directional manner with a remote located Cloud Based Geographical Database 61. The towing vehicle 1, communicates using the cellular mobile network using either a cellular communications radio within the Central Controller 20 and/or by using a nominated mobile telephone within the towing vehicle 1 connected by either BLE (Bluetooth Low Energy) and/or WiFi connection with the mobile telephone located within the towing vehicle 1.

The towing vehicle 1 sends and receives data in a bi-directional manner 59 using standard cellular towers 58 located within the vicinity of the towing vehicle 1. The data is then relayed onwards via the cellular tower 58 to the Cloud Based Geographical Database 61 in a bi-directional manner 60 once again to the remotely located storage database. The data transmitted 59 from the towing vehicle 1 would include GPS (Global Position System) coordinates from the GPS Communications Module 21 located within the Central Controller 20, along with IMUs 5, 6, 14, 17 and 25 sensor data logged just prior to the onset of the trailer oscillations ("Snaking") movements commencing and further data until the oscillations ("Snaking") movements have subsided or completely stopped. The data transmitted and stored within the Cloud Based Geographical Database 61 would also include trailer 7 and towing vehicle 1 data in relation to trailer braking control signals and towing vehicle acceleration control inputs necessary to stop the oscillations ("Snaking") movements of the trailer 7 and towing vehicle 1. The aforementioned data 59, which would then be relayed via a cellular tower 58 onwards in a bi-directional manner 60 using the cellular network to a remotely located Cloud Based Geographical Database 61 as depicted in FIG. 15. The stored data would include towing vehicle type and trailer type details in an anonymous manner so that the data could be analysed and used to help prevent oscillation ("Snaking") occurrences in other vehicles with trailers of a similar type. The bi-directional data transfer 59 and 60 from the Cloud Based Geographical Database 61 allows for Central Controller 20 system updates with this information in the background without intervention from the operator or driver of the towing vehicle to which the system is fitted.

The Cloud Based Geographical Database 61 would store and continually build-up data from a number of suitably equipped towing vehicles similar in nature to the towing vehicle 1 and trailer 7 described above. The Cloud Based Geographical Database 61 would over a period of time build-up and collate a vast amount of data from a large number of different geographical locations within a variety of different countries. The primary advantage of such a system to any towing vehicle 1 type connected to it via the cellular network as described above is that the driver of any suitably equipped vehicle may be warned as he or she approaches a geographical location which has previously been responsible for possibly causing/contributing to trailer oscillations ("Snaking") movements to commence. The location may have a bad road surface or may be on a steep incline (hilly or mountains) or a combination thereof. The system would display a warning message to the driver either on the towing vehicle's dashboard which the system would be able to communicate to the vehicle's display as the Central Controller 20 has a CAN Bus Network interface. The system would also be able to display the message on the vehicle's Internet connected Display/Tablet 57 or smartphone with web browser or App connected wirelessly to the system as previously described above.

The present embodiment of the invention utilises two IMUs located on the trailer 7 and a further two located inline with the rear wheels of the towing vehicle 1. A further IMU 25 is located within the Central Controller 20, which can offer additional data to the FPGA 22 located within the Central Controller 20. The parallel processing power of the hardware based FPGA 22 and the NEON processing ability within the Dual Core ARM Cortex-A9 processors located within the fabric of the FPGA 22 would allow for additional IMUs inputs to be processed if required. A trailer with two axles or more, or an extended length wheelbase may require an additional two or more IMUs located along the centre-line of the second or additional axles. The IMUs are connected via a Bluetooth Low Energy (BLE V5.0 or latest equivalent thereof) wireless link, which offers both a Mesh Network and extended operating range over traditional Bluetooth Low Energy type wireless connection. The additional IMUs can thus easily be wirelessly connected and monitored by the Central Controller 20. The system will allow the additional IMUs signals to be input to the Kalman Filter 22 and then processed with the other IMUs data through the Oscillation Detection, Trailer Braking and Towing Vehicle Algorithms, which control the system. The other parts of the system such as the Trailer Brake Actuators 15 and 16 operate in the same manner as on systems with a smaller number of IMUs. The system will also allow for further brake actuators to be operated, which may be required on trailers with multiple axles as they may have four or more braking actuators. Multiple braking actuators with unique identification numbers for the BLE 5/WiFi link may be operated by the Central Controller 20. The unique identification numbers also ensures a high degree of security, thus ensuring that the brake actuators cannot be operated intentionally or accidentally from a controller source external to the system.

The IMUs 5, 6, 14, 17 and 25 all contain altimeter modules within them. The altitude data is reported back to the Central Controller 20 on a continuous basis during towing. This data will allow the system to detect if it is either climbing or descending in altitude whilst moving. This information is not only useful for geographical purposes and is transmitted to the Cloud Based Geographical Database 61 periodically, but is also used for primary safety analysis. The system will note if the towing vehicle and trailer are descending (reducing altitude) as this most likely indicates subject to the rate of descent that the towing vehicle 1 and trailer 7 are being driven on a steep incline (mountain road or steep downwards orientation). Mountain roads and steep inclines are often the precursor to the development of oscillations, swaying ("Snaking") movements with a trailer as the trailer's momentum can lead to the development of the initial onset and rapid development of oscillations, swaying ("Snaking") movements. The system is programmed to continuously monitor all altitude readings and if a sharp decrease in altitude is detected over a short period of time, which signifies a rapid descent path the system will ensure that it is ready to take appropriate action if the initial onset of oscillations are detected. This is important as it is more difficult to reduce oscillations ("Snaking") movements if the trailer 7 and towing vehicle 1 are on a road with a steep downward incline. The system can also be programmed, if so desired to warn the driver that he is now driving in an area that has roads with steep decline. This will allow the driver to reduce his towing speed gradually and hopefully reduce the chances of any oscillations and swaying ("Snaking") movements occurring before the natural onset of any. The logged data which is uploaded to the Cloud Based Geographical Database 61 will also allow other road users of the same system and database to be forewarned as they approach an area that is prone to trailer oscillations ("Snaking") because of the steep decline (road angle inclination).

This present embodiment of the invention or similar embodiments of the invention should ensure that the driver of the towing vehicle 1 and trailer 7 complete any towing journeys in safety and comfort. The system as previously mentioned can operate in a completely autonomous manner without a form of intervention from the driver. The system may also be overridden by using the control paddles 54 and 55 on the steering wheel 53 should the driver wish to do so. The paddle controls 54 and 55 work in conjunction with the Central Controller 20, and other system components so as to ensure that safety of the towing vehicle 1 and trailer 7 are still paramount along with other road users. The system still logs and transmits data to the Cloud Based Geographical Database 61 whilst the system is be operated from the paddle controls 54 and 55 on the steering wheel 53. The data will be logged with a reference that the system is currently being operated in manual override mode. The vehicle's internet connected display, tablet or smartphone 57, with a web browser or dedicated App (Application) will allow the driver to review his control performance in override mode.

The system can be implemented so that the Central Controller 20 located and fitted within the towing vehicle 1, may be used with more than one trailer. The system can be programmed to recognise a fixed number of different trailers with IMU Sensor and Altimeter Modules 26 and Wireless Braking Actuators 15 and 16. The towing vehicle 1 will be able to communicate with a number of different trailers individually, so that one towing vehicle can be used to tow multiple trailers with all the safety benefits of the system. The system (Central Controller 20) can obviously only be linked and control one trailer at any one moment in time. Logged data from the different trailers will be identifiable within the web browser and or Application by a unique number or name that is assigned to each individual trailer if more than one trailer is being towed with one unique towing vehicle 1. All logged data and operational settings will be individually stored for each trailer so that a quick attachment process can be made without wasting time having to re-program parameters for different trailers which could also be dangerous should an error be made.

The present embodiment of the system and other similar alternative embodiments allow for the system to be used on a variety of different types and sizes of trailers and towing vehicles all with similar beneficial safety and comfort effects.

The invention claimed is:

1. A method for digitally detecting and preventing an initial onset stage and further fundamental development of trailer and towing vehicle oscillations, swaying and snaking movements, wherein a plurality of digital IMUs (Inertial measurement units) are affixed to the trailer and towing vehicle, the method comprising:
   continually monitored in parallel execution by a digital hardware based FPGA (Field Programmable Gate Array) central controller in real-time, the trailer and towing vehicle movements;
   detecting and identifying by the plurality of digital, parallel processed IMUs, the initial onset stage and further fundamental development of trailer and towing vehicle oscillations, swaying and snaking movements, wherein speed of towing vehicle is automatically increased whilst simultaneous application of trailer braking is immediately applied to the trailer wheels without application of the towing vehicle brakes.

2. The method as recited in claim 1, wherein the towing vehicle speed is increased incrementally by 10% of the present vehicle speed by the central controller once communications with a LIDAR system of the vehicle (Light Detection and Ranging) based cruise control or equivalent system has established road conditions are safe to increase the towing vehicle speed by application of increased power from a petrol or diesel engine, electric motor or other propulsion device of the towing vehicle.

3. The method as recited in claim 1, wherein the central controller whilst increasing the towing vehicle speed simultaneously applies a low duty cycle braking force of approximately 35% equally to both left and right wirelessly controlled braking actuator pairs located on the trailer to immediately apply braking force to the trailer without simultaneous application of any braking force to the towing vehicle which is concurrently being accelerated.

4. The method as recited in claim 1, wherein the central controller whilst increasing the towing vehicle speed simultaneously applies a low duty cycle braking force of approximately 35% equally to any number of individual wirelessly controlled braking actuators fitted to the trailer.

5. The method as recited in claim 1, wherein the central controller subsequent to increasing the towing vehicle speed and simultaneous application of the trailer brakes will establish after a short delay of 250 ms to 500 ms (milliseconds) if the oscillations, swaying and snaking movements have subsided or ceased, if the oscillations, swaying and snaking movements have ceased completely the central controller will return to monitoring, however if the oscillations, swaying and snaking movements have remained constant or increased in magnitude the central controller will increase previous acceleration and braking parameters incrementally by an amount calculated within the FPGA hardware of the central controller if safe to do so and apply them once again in an attempt to reduce the oscillations, swaying and snaking movements, once again a short delay of 250 ms to 500 ms (milliseconds) will be given prior to further monitoring and analysis of the oscillations, swaying and snaking movements commencing once again.

6. The method as recited in claim 1, wherein the central controller will in a completely autonomous manner apply full braking force of 100% duty cycle to all the trailer wheels wirelessly controlled brakes via a wireless mesh network connection from the central controller once detected that the trailer and towing vehicle have become detached from each other whilst the trailer is being towed, simultaneous application of the trailer and towing vehicle hazard and brake lights will be made immediately upon detection that the trailer and towing vehicle have separated, a separation being detected by a physical wiring connection failing to the trailer and a RSSI (radio signal strength indication) continuing to fall in strength as the distance between the trailer and towing vehicle continues to increases.

7. The method as recited in claim 1, wherein the central controller will operate in a completely autonomous manner in an attempt to monitor, control and prevent the initial onset and further development of trailer and towing vehicle oscillations, swaying and snaking movements, should the central controller detect the initial onset of trailer and towing vehicle movements the central controller will attempt to alleviate and stop them in a controlled manner as quickly and as safely as possible without any intervention of a driver of the towing vehicle.

8. The method as recited in claim 1, wherein the central controller will operate in a completely autonomous manner in an attempt to monitor, control and prevent the initial onset and further development of trailer and towing vehicle oscillations, swaying and snaking movements, the central controller may also be controlled with manual inputs to paddle controls mounted on the steering wheel of the towing vehicle, the paddle controls will allow a driver of the towing vehicle to apply acceleration to the towing vehicle whilst simultaneous braking actions are applied to the trailer wheels if the central controller detects that it is safe to do so once communications with the LIDAR system of the vehicle (Light Detection and Ranging) based cruise control or equivalent system has established road conditions are safe to increase towing vehicle road speed by application of increased power from a petrol or diesel engine, electric motor or other propulsion device of the towing vehicle.

9. A method as recited in claim 1, wherein the central controller using a cellular mobile network either from a towing vehicle's wireless internet access point and or a cellular mobile telephone connected wirelessly to the central controller, which will transmit bi-directional data to and receive data from a cloud based geographical database using cellular mobile towers located alongside a road which the towing vehicle and trailer is being driven along, this data which will have been logged by the central controller within the towing vehicle and subsequently stored in a remote cloud based geographical server, which will be used to warn users of the system of possible pending danger from potential oscillations, swaying and snaking hazards based on previous data stored in the remote cloud based geographical database from all users of a system whose data was transmitted in an anonymous manner, geographical locations being logged and matched to the towing vehicle's location from a GPS (global positioning system) communications module located within the central controller of the towing vehicle.

10. A system for digitally detecting and preventing an initial onset stage and further fundamental development of trailer and towing vehicle oscillations, swaying and snaking movements, comprising:
 a plurality of digital IMUs (Inertial measurement units) affixed to the trailer and towing vehicle;
 a digital hardware based FPGA (Field Programmable Gate Array) central controller for continually monitored in parallel execution in real-time, the trailer and towing vehicle movements;
 detecting and identifying by the plurality of digital, parallel processed IMUs, the initial onset stage and further fundamental development of trailer and towing vehicle oscillations, swaying and snaking movements, wherein speed of towing vehicle is automatically increased whilst simultaneous application of trailer braking is immediately applied to the trailer wheels without application of the towing vehicle brakes.

11. The system of claim 10 further comprising: a pair of paddle switches mounted to a steering wheel of the towing vehicle which are connected to the central controller via a can bus network of the towing vehicle.

* * * * *